UNITED STATES PATENT OFFICE.

GEORGE E. DUNTON, OF NEW YORK, N. Y.

COMPOSITION OF MATTER TO BE USED IN FORMING MOLDS EMPLOYED IN THE ART OF ELECTROTYPING.

996,751.   Specification of Letters Patent.   Patented July 4, 1911.

No Drawing.   Application filed November 2, 1910. Serial No. 590,393.

*To all whom it may concern:*

Be it known that I, GEORGE E. DUNTON, residing at New York city, county of New York, State of New York, a citizen of the United States, have invented a certain new and useful Improved Composition of Matter to be Used in Forming Molds Employed in the Art of Electrotyping; and I do hereby declare the following to be a full, clear, and exact description of the invention, such as will enable others skilled in the art to which it pertains to make and use the same.

My invention relates to composition of matter to be used in forming molds employed in the art of electrotyping.

The material for forming molds used in the electrotyping art for the production of printing plates is commonly made of some substance such as beeswax, ozocerite wax or like material which contains an appreciable percentage of grease, oil or oily substance in their composition. When pressure is applied to the form or cut in making the impression in the molds, it causes the grease or oily substance to be forced out and appear on the face of the mold in the form of a thin coating or film, said coating or film is very troublesome and annoying to the electrotyper as it causes imperfect and faulty reproductions, especially in case where the so-called half tone illustrations are being made which are composed or made up of a collection of very fine dots.

It has for its object to provide a composition containing wax in which the grease, oil or oily substance therein is converted into a saponaceous substance preparatory to mixing the wax with the other ingredients so that there will be no grease, oil or oily substance in the composition.

The composition consists in the following ingredients in about the proportions stated:—

| | |
|---|---|
| Wax (preferably ozocerite or beeswax) | 50 pounds |
| Gum chicle | 2 pounds |
| Venetian turpentine | 4 ounces |
| Borax | ¼ ounce |
| Caustic soda | 2 ounces |

Place 50 pounds of the wax in a steam heated kettle or melting pot and allow the same to become thoroughly melted, then add while constantly stirring two ounces of caustic soda and one fourth ounce of borax and continue the stirring until the sodas have dissolved. When there is no more froth on the top of the melted wax add two pounds of gum chicle and finally when the frothing has again subsided, add four ounces of Venetian turpentine. After a final vigorous stirring the mixture is ready for use. The alkali (borax) and the caustic alkali (caustic soda) act on the grease, oil or greasy or oily substance in the wax and convert it into soap or saponaceous substance (incomplete soap) which is taken up by the wax and redissolved. The wax thus loses all traces of its original fatty, oily or greasy element, the chicle, turpentine and saponaceous substance enter into the structure of the wax. The gum chicle makes the composition plastic and elastic, when soft, imparts toughness but not brittleness, when cold, and gives to the wax those qualities necessary to take a high polish.

I do not wish to confine myself strictly to the ingredients herein stated of the exact proportion of each ingredient stated, as they may be varied and other combinations may be made to produce the same results and equivalent ingredients used and still come within the scope and spirit of my invention.

What I claim is:—

1. A composition comprising wax, gum, an alkali and another alkali which is caustic, substantially as described.

2. A composition comprising wax, gum and an alkali, substantially as described.

3. A composition comprising wax, turpentine, an alkali and another alkali which is caustic, substantially as described.

4. A composition comprising ozocerite, gum chicle, Venetian turpentine, borax and caustic soda, substantially as described.

5. A composition comprising wax, gum chicle, borax, caustic soda and a liquid for increasing the plasticity of the composition, substantially as described.

6. A composition comprising wax, gum in a fluid state, borax, caustic soda and a liquid for increasing the plasticity of the composition, substantially as described.

7. A composition comprising wax, turpentine, an alkali and another alkali which is caustic, substantially as described.

8. A composition comprising wax, gum, borax and a caustic alkali, substantially as described.

9. A composition comprising wax, gum, an alkali and a liquid for increasing the plasticity of the composition, substantially as described.

In testimony whereof, I affix my signature in the presence of two witnesses.

GEORGE E. DUNTON.

Witnesses:
H. BECKER,
F. S. DUFF.